(12) United States Patent
Simmons

(10) Patent No.: US 10,969,857 B2
(45) Date of Patent: *Apr. 6, 2021

(54) TOUCH SENSOR MODE TRANSITIONING

(71) Applicant: ATMEL CORPORATION, Chandler, AZ (US)

(72) Inventor: Martin J. Simmons, Hampshire (GB)

(73) Assignee: Amtel Corporation, Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/232,224

(22) Filed: Dec. 26, 2018

(65) Prior Publication Data
US 2019/0129494 A1 May 2, 2019

Related U.S. Application Data

(63) Continuation of application No. 15/060,277, filed on Mar. 3, 2016, now Pat. No. 10,175,741.

(51) Int. Cl.
G06F 1/3234 (2019.01)
G06F 1/16 (2006.01)

(52) U.S. Cl.
CPC .......... G06F 1/3262 (2013.01); G06F 1/1684 (2013.01)

(58) Field of Classification Search
CPC ............................ G06F 1/3262; G06F 1/1684
See application file for complete search history.

(56) References Cited

U.S. PATENT DOCUMENTS

| | | | |
|---|---|---|---|
| 7,411,581 B2 * | 8/2008 | Hardie-Bick | G06F 3/0433 178/18.01 |
| 7,663,607 B2 | 2/2010 | Hotelling et al. | |
| 7,760,192 B2 * | 7/2010 | Berstis | H03K 17/94 345/174 |
| 7,864,503 B2 | 1/2011 | Chang | |
| 7,875,814 B2 | 1/2011 | Chen et al. | |
| 7,920,129 B2 | 4/2011 | Hotelling et al. | |
| 8,031,094 B2 | 10/2011 | Hotelling et al. | |
| 8,031,174 B2 | 10/2011 | Hamblin et al. | |
| 8,040,326 B2 | 10/2011 | Hotelling et al. | |
| 8,049,732 B2 | 11/2011 | Hotelling et al. | |

(Continued)

FOREIGN PATENT DOCUMENTS

WO 201212247 A2 9/2012

OTHER PUBLICATIONS

Myers, S. A. et al., "Electronic Devices With Concave Displays," U.S. Appl. No. 61/454,936, filed Mar. 21, 2011, 23 pages.

(Continued)

Primary Examiner — Mihir K Rayan
(74) Attorney, Agent, or Firm — TraskBritt

(57) ABSTRACT

In one embodiment, a touch sensor controller includes a processor and a monitoring component coupled to the processor. The monitoring component is configured to perform operations comprising receiving, from an impact sensor, an output signal. The output signal is indicative of a plurality of impacts detected by the impact sensor to a surface of a housing of a device. The monitoring component is further configured to perform operations comprising initiating, based on the output signal corresponding to a predefined impact pattern, a transition of the touch sensor from a first power mode to a second power mode.

20 Claims, 6 Drawing Sheets

(56) References Cited

U.S. PATENT DOCUMENTS

| | | | |
|---|---|---|---|
| 8,179,381 B2 | 5/2012 | Frey et al. | |
| 8,217,902 B2 | 7/2012 | Chang et al. | |
| 8,674,958 B1 | 3/2014 | Kravets et al. | |
| 8,723,824 B2 | 5/2014 | Myers et al. | |
| 8,760,426 B1 | 6/2014 | Strand et al. | |
| 9,477,330 B2 | 10/2016 | Stern | |
| 10,175,741 B2* | 1/2019 | Simmons | G06F 1/1684 |
| 2002/0030911 A1 | 3/2002 | Mutoh | |
| 2005/0078093 A1 | 4/2005 | Peterson, Jr. et al. | |
| 2005/0146513 A1 | 7/2005 | Hill et al. | |
| 2006/0097983 A1* | 5/2006 | Haggman | G06F 1/1626 345/156 |
| 2006/0211499 A1 | 9/2006 | Bengtsson et al. | |
| 2006/0263068 A1* | 11/2006 | Jung | G06F 3/041 386/362 |
| 2007/0288779 A1 | 12/2007 | Kim | |
| 2008/0162996 A1 | 7/2008 | Krah et al. | |
| 2008/0309628 A1 | 12/2008 | Krah et al. | |
| 2008/0309635 A1 | 12/2008 | Matsuo | |
| 2009/0189867 A1 | 7/2009 | Krah et al. | |
| 2009/0195517 A1* | 8/2009 | Duheille | G06F 3/043 345/177 |
| 2009/0309851 A1 | 12/2009 | Bernstein | |
| 2009/0315854 A1 | 12/2009 | Matsuo | |
| 2010/0085216 A1 | 4/2010 | MS | |
| 2011/0037734 A1* | 2/2011 | Pance | G06F 3/043 345/177 |
| 2012/0062470 A1* | 3/2012 | Chang | G06F 1/3262 345/173 |
| 2012/0098783 A1 | 4/2012 | Badaye et al. | |
| 2012/0242588 A1 | 9/2012 | Myers et al. | |
| 2012/0242592 A1 | 9/2012 | Rothkopf et al. | |
| 2012/0243151 A1 | 9/2012 | Lynch | |
| 2012/0243719 A1 | 9/2012 | Franklin et al. | |
| 2012/0256872 A1 | 10/2012 | Kawaguchi et al. | |
| 2013/0076612 A1 | 3/2013 | Myers | |
| 2014/0370855 A1 | 12/2014 | Koss et al. | |
| 2015/0123923 A1 | 5/2015 | Stern | |
| 2015/0301647 A1 | 10/2015 | Sato et al. | |
| 2016/0070413 A1 | 3/2016 | Geaghan | |
| 2016/0195986 A1 | 7/2016 | Kwon et al. | |
| 2016/0299606 A1 | 10/2016 | Go | |
| 2017/0010653 A1* | 1/2017 | Chang | G06F 3/0416 |
| 2017/0131798 A1 | 5/2017 | Geaghan et al. | |
| 2017/0153763 A1 | 6/2017 | Vavra et al. | |
| 2017/0168631 A1* | 6/2017 | Roberts-Hoffman | G06F 1/3262 |

OTHER PUBLICATIONS

Lynch, S. B., "Electronic Devices With Convex Displays," U.S. Appl. No. 61/454,950, filed Mar. 21, 2011, 28 pages.

Rothkopf, F. R. et al., "Electronic Devices With Flexible Displays," U.S. Appl. No. 61/454,894, filed Mar. 21, 2011, 41 pages.

Simmons, M. J., Non-Final Rejection, U.S. Appl. No. 15/060,277, dated Nov. 13, 2017, 17 pages.

Simmons, M. J., Amendment after Non-Final Rejection, U.S. Appl. No. 15/060,277, dated Feb. 2, 2018, 15 pages.

Simmons, M. J., Final Rejection, U.S. Appl. No. 15/060,277, dated Jun. 7, 2018, 16 pages.

Simmons, M. J., Response after Final Rejection, U.S. Appl. No. 15/060,277, dated Aug. 7, 2018, 10 pages.

Simmons, M. J., Notice of Allowance, U.S. Appl. No. 15/060,277, dated Sep. 6, 2018, 5 pages.

* cited by examiner

TOUCH SENSOR MODE TRANSITIONING

CROSS REFERENCE TO RELATED APPLICATION

This application is a continuation under 35 U.S.C. § 120 of U.S. application Ser. No. 15/060,277, filed Mar. 3, 2016, now U.S. Pat. No. 10,175,741, issued Jan. 8, 2019, and entitled Touch Sensor Mode Transitioning, the disclosure of which is hereby incorporated herein in its entirety by this reference.

TECHNICAL FIELD

This disclosure generally relates to touch sensors.

BACKGROUND

According to an example scenario, a touch sensor detects the presence and position of an object (e.g., a user's finger or a stylus) within a touch-sensitive area of touch sensor array overlaid on a display screen, for example. In a touch-sensitive-display application, a touch sensor array allows a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a touch sensor.

There are a number of different types of touch sensors, such as for example resistive touch sensors, surface acoustic wave touch sensors, and capacitive touch sensors. In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance may occur within the touch screen at a position of the touch sensor of the touch screen that corresponds to the position of the object within the touch sensitive area of the touch sensor. A touch sensor controller processes the change in capacitance to determine the position of the change of capacitance within the touch sensor (e.g., within a touch sensor array of the touch sensor).

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION

Devices that include touch sensors often spend significant time in a state in which the touch sensor is unused. For example, a user may place the device in a stand-by mode, or sleep mode, in which in an embodiment, a display of the device is turned off and the touch sensor of the device is not actively detecting the presence of an object or is detecting the presence of an object on a reduce basis relative to when the device is fully powered. As another example, the device may be in use for some background application (e.g., playing music), but the touch sensor of the device may go unused while that background application is operating. When the device is in a stand-by mode or the touch sensor is otherwise unused, for example, it is desirable to conserve power that would otherwise be consumed by the touch sensor and other components. Detecting when to power on the touch sensor (e.g., a touch sensor controller of the touch sensor) can introduce power-consuming activities and present additional problems.

An embodiment of the present disclosure provides a technique for transitioning a touch sensor from a first power mode to a second power mode. For example, transitioning a touch sensor from a first power mode to a second power mode may include waking the touch sensor (e.g., a touch sensor controller of the touch sensor) of the device from a low power mode, described below. As a particular example, embodiments of the present disclosure use an impact sensor that is able to detect impacts (e.g., taps) to a surface of the device for detecting when to transition the touch sensor (e.g., the touch sensor controller of the touch sensor) from a first power mode (e.g., a low power mode) to a second power mode (e.g., in which power is provided to the touch sensor, such as for example a touch sensor controller of the touch sensor, for detecting the presence of an object such as a stylus or finger.

In one embodiment, an apparatus (e.g., a device, such as, for example, a mobile device) includes a housing having a surface, a touch sensor coupled to the housing, an impact sensor coupled to the housing, and a monitoring component coupled to the housing. The impact sensor is configured to detect impacts to the surface. The impact sensor is configured to generate an output signal indicative of the impacts. The monitoring component is configured to initiate, based on the output signal corresponding to a predefined impact pattern, a transition of the touch sensor from a first power mode to a second power mode.

Figure 1:
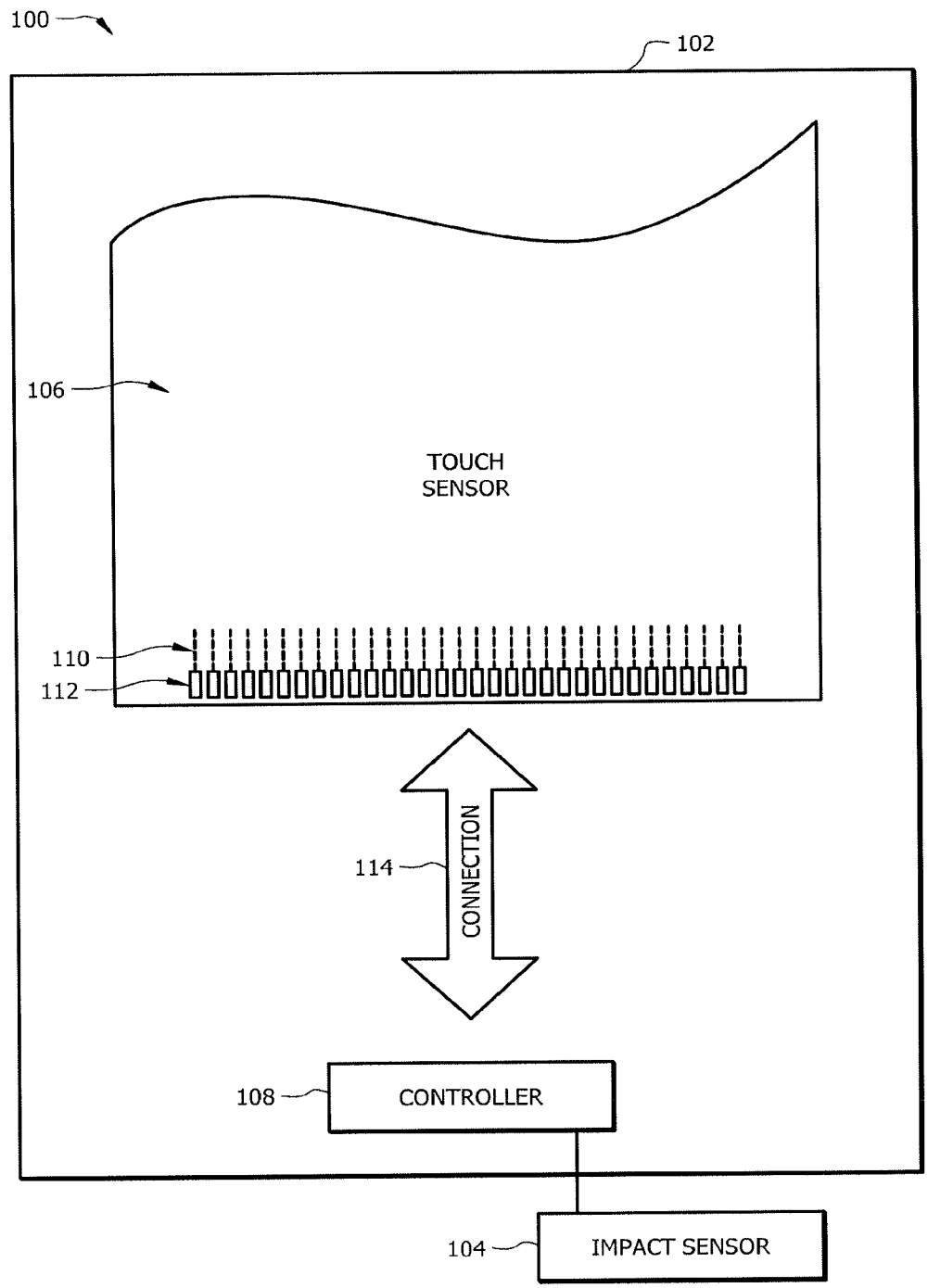
FIG. 1 illustrates an example system that includes a touch sensor and an impact sensor, according to an embodiment of the present disclosure.

FIG. 1 illustrates an example system 100 that includes a touch sensor 102 and an impact sensor 104, according to an embodiment of the present disclosure. Touch sensor 102 includes touch sensor array 106 and touch sensor controller 108. Touch sensor array 106 and touch sensor controller 108 detect the presence and position of a touch or the proximity of an object within a touch-sensitive area of touch sensor array 106.

Touch sensor array 106 includes one or more touch-sensitive areas. In one embodiment, touch sensor array 106 includes an array of electrodes disposed on one or more substrates, which may be made of a dielectric material.

Reference to a touch sensor array may encompass both the electrodes of touch sensor array 106 and the substrate(s) on which they are disposed. Alternatively, reference to a touch sensor array may encompass the electrodes of touch sensor array 106, but not the substrate(s) on which they are disposed.

In one embodiment, an electrode is an area of conductive material forming a shape, such as for example a disc, square, rectangle, thin line, other shape, or a combination of these shapes. One or more cuts in one or more layers of conductive material may (at least in part) create the shape of an electrode, and the area of the shape may (at least in part) be bounded by those cuts. In one embodiment, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In one embodiment, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates, in any combination, electrodes made of other conductive materials forming other shapes with other fill percentages having other patterns.

The shapes of the electrodes (or other elements) of a touch sensor array 106 constitute, in whole or in part, one or more macro-features of touch sensor array 106. One or more characteristics of the implementation of those shapes (such as, for example, the conductive materials, fills, or patterns within the shapes) constitute in whole or in part one or more micro-features of touch sensor array 106. One or more macro-features of a touch sensor array 106 may determine one or more characteristics of its functionality, and one or more micro-features of touch sensor array 106 may determine one or more optical features of touch sensor array 106, such as transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of touch sensor array 106. For example, the mechanical stack may include a first layer of optically clear adhesive (OCA) beneath a cover panel. The cover panel may be clear and made of a resilient material for repeated touching, such as for example glass, polycarbonate, or poly(methyl methacrylate) (PMMA). This disclosure contemplates cover panel being made of any material. The first layer of OCA may be disposed between the cover panel and the substrate with the conductive material forming the electrodes. The mechanical stack may also include a second layer of OCA and a dielectric layer (which may be made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 106 and touch sensor controller 108. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display.

One or more portions of the substrate of touch sensor array 106 may be made of polyethylene terephthalate (PET) or another material. This disclosure contemplates any substrate with portions made of any material(s). In one embodiment, one or more electrodes in touch sensor array 106 are made of ITO in whole or in part. Additionally or alternatively, one or more electrodes in touch sensor array 106 are made of fine lines of metal or other conductive material. For example, one or more portions of the conductive material may be copper or copper-based and have a thickness of approximately 5 microns ($\mu m$) or less and a width of approximately 10 $\mu m$ or less. As another example, one or more portions of the conductive material may be silver or silver-based and similarly have a thickness of approximately 5 $\mu m$ or less and a width of approximately 10 $\mu m$ or less. This disclosure contemplates any electrodes made of any materials.

In one embodiment, touch sensor array 106 implements a capacitive form of touch sensing. In a mutual-capacitance implementation, touch sensor array 106 may include an array of drive and sense electrodes forming an array of capacitive nodes. A drive electrode and a sense electrode may form a capacitive node. The drive and sense electrodes forming the capacitive node are positioned near each other but do not make electrical contact with each other. Instead, in response to a signal being applied to the drive electrodes for example, the drive and sense electrodes capacitively couple to each other across a space between them. A pulsed or alternating voltage applied to the drive electrode (by touch sensor controller 108) induces a charge on the sense electrode, and the amount of charge induced is susceptible to external influence (such as a touch or the proximity of an object). When an object touches or comes within proximity of the capacitive node, a change in capacitance may occur at the capacitive node and touch sensor controller 108 measures the change in capacitance. By measuring changes in capacitance throughout the array, touch sensor controller 108 determines the position of the touch or proximity within touch-sensitive areas of touch sensor array 106.

In a self-capacitance implementation, touch sensor array 106 may include an array of electrodes of a single type that may each form a capacitive node. When an object touches or comes within proximity of the capacitive node, a change in self-capacitance may occur at the capacitive node and touch sensor controller 108 measures the change in capacitance, for example, as a change in the amount of charge implemented to raise the voltage at the capacitive node by a predetermined amount. As with a mutual-capacitance implementation, by measuring changes in capacitance throughout the array, touch sensor controller 108 determines the position of the touch or proximity within touch-sensitive areas of touch sensor array 106. This disclosure contemplates any form of capacitive touch sensing.

In one embodiment, one or more drive electrodes together form a drive line running horizontally or vertically or in other orientations. Similarly, in one embodiment, one or more sense electrodes together form a sense line running horizontally or vertically or in other orientations. As one particular example, drive lines run substantially perpendicular to the sense lines. Reference to a drive line may encompass one or more drive electrodes making up the drive line, and vice versa. Reference to a sense line may encompass one or more sense electrodes making up the sense line, and vice versa.

In one embodiment, touch sensor array 106 includes drive and sense electrodes disposed in a pattern on one side of a single substrate. In such a configuration, a pair of drive and sense electrodes capacitively coupled to each other across a space between them form a capacitive node. As an example self-capacitance implementation, electrodes of a single type are disposed in a pattern on a single substrate. In addition or as an alternative to having drive and sense electrodes disposed in a pattern on one side of a single substrate, touch sensor array 106 may have drive electrodes disposed in a pattern on one side of a substrate and sense electrodes disposed in a pattern on another side of the substrate. Moreover, touch sensor array 106 may have drive electrodes disposed in a pattern on one side of one substrate and sense electrodes disposed in a pattern on one side of another substrate. In such configurations, an intersection of a drive electrode and a sense electrode forms a capacitive node. Such an intersection may be a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, a change in capacitance at a capacitive node of touch sensor array 106 may indicate a touch or proximity input at the position of the capacitive node. Touch sensor controller 108 detects and processes the change in capacitance to determine the presence and position of the touch or proximity input. In one embodiment, touch sensor controller 108 then communicates information about the touch or proximity input to one or more other components (such as one or more central processing units (CPUs)) of a device that includes touch sensor array 106 and touch sensor controller 108, which may respond to the touch or proximity input by initiating a function of the device (or an application running on the device). Although this disclosure describes a particular touch sensor controller 108 having particular functionality with respect to a particular device and a particular touch sensor 102, this disclosure contemplates other touch sensor controllers having any functionality with respect to any device and any touch sensor.

In one embodiment, touch sensor controller 108 is implemented as one or more integrated circuits (ICs), such as for example general-purpose microprocessors, microcontrollers, programmable logic devices or arrays, application-specific ICs (ASICs). Touch sensor controller 108 comprises any combination of analog circuitry, digital logic, and digital non-volatile memory. In one embodiment, touch sensor controller 108 is disposed on a flexible printed circuit (FPC) bonded to the substrate of touch sensor array 106, as described below. The FPC may be active or passive. In one embodiment, multiple touch sensor controllers 108 are disposed on the FPC.

In an example implementation, touch sensor controller 108 includes a processor unit, a drive unit, a sense unit, and a storage unit. In such an implementation, the drive unit supplies drive signals to the drive electrodes of touch sensor array 106, and the sense unit senses charge at the capacitive nodes of touch sensor array 106 and provides measurement signals to the processor unit representing capacitances at the capacitive nodes. The processor unit controls the supply of drive signals to the drive electrodes by the drive unit and processes measurement signals from the sense unit to detect and process the presence and position of a touch or proximity input within touch-sensitive areas of touch sensor array 106. The processor unit may also track changes in the position of a touch or proximity input within touch-sensitive areas of touch sensor array 106. The storage unit stores programming for execution by the processor unit, including programming for controlling the drive unit to supply drive signals to the drive electrodes, programming for processing measurement signals from the sense unit, and other programming. Although this disclosure describes a particular touch sensor controller 108 having a particular implementation with particular components, this disclosure contemplates touch sensor controller having other implementations with other components.

Tracks 110 of conductive material disposed on the substrate of touch sensor array 106 couple the drive or sense electrodes of touch sensor array 106 to connection pads 112, also disposed on the substrate of touch sensor array 106. As described below, connection pads 112 facilitate coupling of tracks 110 to touch sensor controller 108. Tracks 110 may extend into or around (e.g., at the edges of) touch-sensitive areas of touch sensor array 106. In one embodiment, particular tracks 110 provide drive connections for coupling touch sensor controller 108 to drive electrodes of touch sensor array 106, through which the drive unit of touch sensor controller 108 supplies drive signals to the drive electrodes, and other tracks 110 provide sense connections for coupling touch sensor controller 108 to sense electrodes of touch sensor array 106, through which the sense unit of touch sensor controller 108 senses charge at the capacitive nodes of touch sensor array 106.

Tracks 110 are made of fine lines of metal or other conductive material. For example, the conductive material of tracks 110 may be copper or copper-based and have a width of approximately 100 µm or less. As another example, the conductive material of tracks 110 may be silver or silver-based and have a width of approximately 100 µm or less. In one embodiment, tracks 110 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to tracks 110, touch sensor array 106 may include one or more ground lines terminating at a ground connector (which may be a connection pad 112) at an edge of the substrate of touch sensor array 106 (similar to tracks 110).

Connection pads 112 may be located along one or more edges of the substrate, outside a touch-sensitive area of touch sensor array 106. As described above, touch sensor controller 108 may be on an FPC. Connection pads 112 may be made of the same material as tracks 110 and may be bonded to the FPC using an anisotropic conductive film (ACF). In one embodiment, connection 114 includes conductive lines on the FPC coupling touch sensor controller 108 to connection pads 112, in turn coupling touch sensor controller 108 to tracks 110 and to the drive or sense electrodes of touch sensor array 106. In another embodiment, connection pads 112 are connected to an electromechanical connector (such as, for example, a zero insertion force wire-to-board connector). Connection 114 may or may not include an FPC. This disclosure contemplates any connection 114 between touch sensor controller 108 and touch sensor array 106.

Touch sensor controller 108, and thereby touch sensor 102, may operate in a variety of power modes. In an embodiment, a power mode reflects one or more of the amount of power consumed by one or more components of a device housing touch sensor 102, an amount of power provided to one or more components of a device housing touch sensor 102, and the components of the device housing touch sensor 102 to which power is provided.

As a first example of a power mode, touch sensor controller 108 may at times operate in a first power mode, which may be referred to as a low power mode. In one embodiment, a low power mode of touch sensor controller 108 includes, either exclusively or non-exclusively, when touch scanning operations of touch sensor controller 108 are powered down. In such an example, touch sensor controller 108 may be in a state where it does not receive power for scanning of touch sensor array 106 to detect the presence of an object. For example, in this scenario, during the low power mode a processor of touch sensor controller 108 does not receive power for touch scanning operations (e.g., scanning of touch sensor array 106 for detecting the presence of an object). While an example low power mode in which touch scanning operations are powered down has been described, the present disclosure contemplates different and or additional operations of touch sensor 102 being powered down in the low power mode.

Touch sensor 102 may enter this lower power mode in a variety of situations. For example, touch sensor 102 may enter a low power mode when a device that houses touch sensor 102 enters a standby mode. As another example, touch sensor 102 may enter a low power mode when touch sensor 102 has not detected the presence of an object (e.g., a finger or a stylus contacting or otherwise within a detectable range of touch sensor 102) for some predetermined period of time. This situation could be encountered, for example, if the device that houses touch sensor 102 is being used for some background application (e.g., playing music) but the user of the device is otherwise not interacting with touch sensor 102 of device 200.

As a second example of a power mode, a second power mode may refer to a mode in which power is provided to touch sensor 102 (e.g., to touch sensor controller 108) for detecting the presence of an object such as a stylus or finger. Additionally or alternatively, the second power mode may include a mode in which power is provided to touch sensor 102 (e.g., to touch sensor controller 108) for calibrating touch sensor 102, as will be described in greater detail below. It may be desirable for touch sensor 102 (e.g., touch sensor controller 108) to be in the second power mode when a user has indicated a desire to provide input to the device housing touch sensor 102 via touch sensor 102.

Impact sensor 104, which may also be referred to as a shock sensor, is a component that detects impacts to a surface of a housing of a device that houses touch sensor 102 and impact sensor 104. As particular examples, impact sensor 104 may include any combination of a vibration sensor, a piezoelectric sensor, and an accelerometer. These particular types of impact sensors are provided as examples only. The present disclosure contemplates impact sensor 104 being any component capable of detecting an impact to a surface of a housing of the device. System 100 may include any number of impact sensors 104, according to particular implementation considerations.

In one embodiment, an impact to a surface of a housing of the device that houses touch sensor 102 and impact sensor 104 is a physical impact and includes a physical contact made by an object to a surface of the device. An impact includes any impact that is detectable by impact sensor 104. As just one example, an impact includes a user tapping the surface of the device with an object (e.g., the user's finger). As a more particular example, an impact may include a user of a device that houses touch sensor 102 and impact sensor 104 tapping a cover layer overlying touch sensor array 106. The present disclosure, however, contemplates impacts of any type on any area of the device that houses touch sensor 102 and impact sensor 104, depending on the placement of impact sensor 104 within the device and the associated capabilities of impact sensor 104.

As will be described in greater detail below with reference to FIG. 2, the present disclosure contemplates impact sensor 104 being located anywhere within the housing of the device that houses touch sensor 102 and impact sensor 104. Depending on the type of impact sensor 104 used, the location of impact sensor 104 may affect the types of impacts detected by impact sensor 104 or the magnitude of the physical contact for the associated impact to be detectable by impact sensor 104. In one embodiment, impact sensor 104 is positioned to optimize detection of impacts to a surface of the device that overlays touch sensor array 106. Locating impact sensor 104 within the device that houses touch sensor 102 and impact sensor 104 in an area such that impact sensor 104 detects impacts to a surface (e.g., a cover layer) of the device overlying touch sensor array 106 and the display of the device may increase the likelihood that impact sensor 104 detects deliberate attempts by a user of the device to impact the surface (e.g., by tapping the surface) and largely ignores or otherwise does not detect (or does not sufficiently detect) impacts to other areas of the device or otherwise unintended impacts. Additionally or alternatively, as described in greater detail below with reference to FIG. 4, this arrangement may increase the likelihood that conditions following a detected impact are suitable for calibrating touch sensor 102.

Impact sensor 104 facilitates detecting when to transition touch sensor 102 (e.g., touch sensor controller 108) from a first power mode to a second power mode. In an embodiment, the first power mode is the low power mode described above. For purposes of this description, transitioning touch sensor 102 (e.g., touch sensor controller 108) from the first power mode to the second power mode may be referred to as waking touch sensor 102 (e.g., touch sensor controller 108). In an embodiment, the second power mode is the above-described second power mode in which power is provided to touch sensor 102 (e.g., to touch sensor controller 108) for detecting the presence of an object such as a stylus or finger and/or in which power is provided to touch sensor 102 (e.g., to touch sensor controller 108) for calibrating touch sensor 102, as will be described in greater detail below.

Impact sensor 104 communicates an output signal indicative of impacts detected by impact sensor 104. As just one example, the output signal is a waveform indicating a value (e.g., a voltage) or series of values (e.g., voltages) measured by impact sensor 104. In one embodiment, impact sensor 104 transmits or otherwise communicates the output signal to a monitoring component, described below. For example, impact sensor 104 may transmit the raw waveform indicating a value (e.g., a voltage) or series of values (e.g., voltages) measured by impact sensor 104.

Additionally or alternatively, in one embodiment, prior to communicating the output signal to the monitoring component, impact sensor 104 applies a threshold (i.e., a threshold impact signal value) to detect whether a detected potential impact registers as an impact that is of sufficient magnitude to communicate to the monitoring component of touch sensor 102. For example, impact sensor 104 may generate in impact signal indicative of impacts to a surface of the device and process the impact signal, by comparing the signal to a threshold impact signal value, to detect whether portions of the signal correspond to the threshold impact signal value. In such an example, the output signal communicated by impact sensor 104 may include portions of the impact signal that correspond to the threshold impact signal value but exclude portions of the impact signal that do not correspond to the threshold impact signal value. Additionally or alternatively, impact sensor 104 may output the generated impact signal (which may include both portions that correspond to the threshold impact signal value and portions that do not correspond to the threshold impact signal value) for comparison to the threshold impact signal value by another component, such as touch sensor controller 108. Applying a threshold impact signal value to the impact signal generated by impact sensor 104 (whether by impact sensor 104 or another component) may reduce or eliminate unintended impacts to the surface of the device causing the wake-up operations described below to be triggered in unintended situations.

Impact sensor 104 is coupled to touch sensor controller 108. In one embodiment, one or more terminals of impact sensor 104 are connected to pins on an integrated circuit that implements touch sensor controller 108. The present disclosure contemplates impact sensor 104 being coupled to touch sensor controller 108 in any manner. Although impact sensor 104 is illustrated outside touch sensor 102, impact sensor 104 may be separate from or part of touch sensor 102. In one embodiment, impact sensor 104 is physically distinct from but communicatively coupled to touch sensor controller 108. Alternatively, impact sensor 104 may be located on touch sensor controller 108. For example, impact sensor 104 may be formed on the same silicon on which touch sensor controller 108 is formed. In one embodiment, impact sensor 104 is located proximate the surface of the device at which impacts are desired to be detected. For example, impact sensor 104 may be located proximate the surface of the device with which the user interacts to provide touch input.

Touch sensor controller 108 receives and processes the output signal communicated by impact sensor 104. In one embodiment, touch sensor controller 108 includes an impact sensor monitoring component that monitors and evaluates the output signal from impact sensor 104 to detect whether to initiate a transition of touch sensor 102 (e.g., touch sensor controller 108) from a first power mode to a second power mode. An example of the monitoring component is described below with reference to FIG. 4. Although touch sensor controller 108 is described as including the monitoring component, the present disclosure contemplates the device housing touch sensor 102 including the monitoring component in any manner such that the monitoring component is capable of performing its associated operations.

In one embodiment, touch sensor controller 108 (e.g., the monitoring component of touch sensor controller 108) detects whether the output signal received from impact sensor 104 corresponds to a predefined impact pattern and, based on the output signal corresponding to the predefined impact pattern, initiates a transition of the touch sensor 102 (e.g., touch sensor controller 108) from a first power mode (e.g., a low power mode) to a second power mode. A surface of a housing of the device that houses touch sensor 102, impact sensor 104, and the monitoring component may encounter a number of impacts. For example, when the device is in a bag or pocket, the surface may experience impacts due to movement and other nearby objects (e.g., keys, coins, books, or other objects) impacting the surface. As another example, a user may cause an impact when the user picks up the device to carry the device or may inadvertently touch various surfaces of the device. As yet another example, according to an embodiment of the present disclosure, a user may impact (e.g., by tapping) a surface (e.g., a cover glass overlying the display) of the housing of the device, with impacts corresponding to the predefined impact pattern, to indicate a desire to provide input to via the touch screen of the device (e.g., to transition the touch sensor from a first power mode to a second power mode so that such input becomes detectable by touch sensor 102 of the device). It may be desirable to distinguish intended impacts from unintended impacts.

In one embodiment, the predefined impact pattern specifies a predetermined number of impacts (that correspond to the threshold impact signal value) occurring within a predetermined period of time. As particular examples, predefined impact pattern 412 may correspond to a double-tap impact pattern, a triple-tap impact pattern, or any other suitable impact pattern. For example, a suitable predefined impact pattern reflects an impact pattern reasonably distinguishable from an object inadvertently impacting the surface of the device. In an embodiment, the predetermined period of time between or among impacts is set to value for increasing the likelihood that impacts detected for causing a mode transition correspond to deliberate attempts by a user of the device that houses touch sensor 102 and impact sensor 104 to impact the device according to the predefined impact pattern (e.g., a double-tap impact pattern, a triple-tap impact pattern, or any other suitable impact pattern).

In one embodiment, the first power mode (e.g., the low power mode) of touch sensor 102 includes a mode in which scanning of touch sensor array 106 by touch sensor controller 108 for detecting the presence of an object is powered down and in which monitoring, by touch sensor controller 108 (e.g., by the monitoring component of touch sensor controller 108) for output signals from impact sensor 104 is powered. In one embodiment, impact sensor 104 is a relatively low-power component. This may impact the choice of the type of component used to implement impact sensor 104. In one embodiment, impact sensor 104 and an associated component for monitoring an output of impact sensor 104 (e.g., a monitoring component of touch sensor controller 108, as described in greater detail below) consume less power than would be used to power touch sensor controller 108 to perform touch sensing operations, such as for example scanning touch sensor array 106 to detect the presence of an object (e.g., in proximity to touch sensor array 106). The low power consumed by impact sensor 104 and the monitoring component of touch sensor controller 108 to perform their associated operations relative to the power consumed by touch sensor controller 108 to perform touch sensing operations, such as for example scanning touch sensor array 106 to detect objects in proximity to touch sensor array 106, may contribute to various advantages of certain embodiments of the present disclosure, as described in greater detail below.

Figure 2:
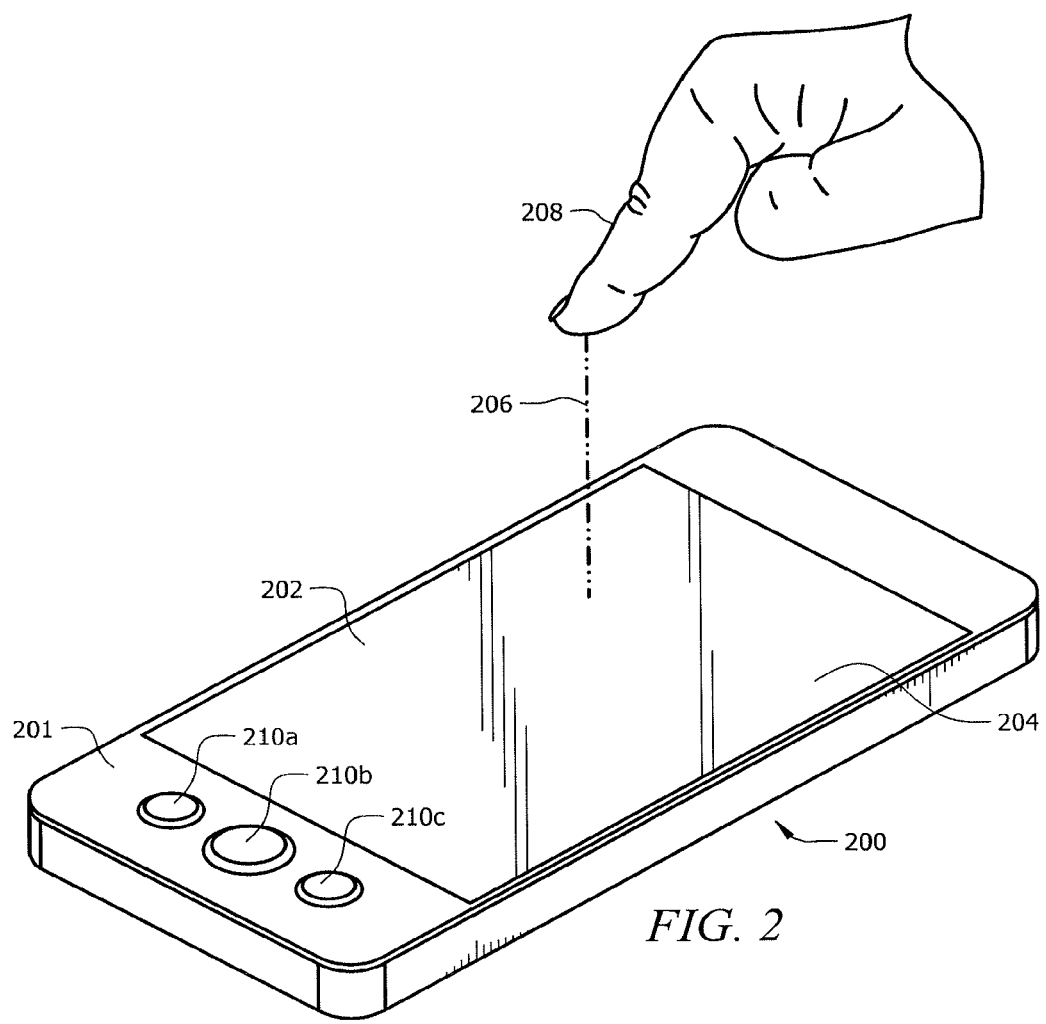
FIG. 2 illustrates an example device that houses the touch sensor and impact sensor, according to an embodiment of the present disclosure.

FIG. 2 illustrates an example device 200 that houses touch sensor 102 and impact sensor 104, according to an embodiment of the present disclosure. Device 200 is any personal digital assistant, cellular telephone, smartphone, tablet computer, and the like. In one embodiment, device 200 includes other types of devices, such as automatic teller machines (ATMs), home appliances, personal computers, and any other such device having a touch screen. In the illustrated example, components of system 100 are internal to device 200. Although this disclosure describes a particular device 200 having a particular implementation with particular components, this disclosure contemplates any device 200 having any implementation with any components.

A particular example of device 200 is a smartphone that includes a housing 201 and a touch-sensitive screen display 202 occupying a portion of a surface 204 of housing 201 of device 200. In an embodiment, housing 201 is an enclosure of device 200, which may contain internal components (e.g., internal electrical components) of device 200. Touch sensor 102, impact sensor 104, and a monitoring component (e.g., monitoring component 408, described below) of touch sensor controller 108 may be coupled, directly or indirectly, to housing 201 of device 200. Touch-sensitive screen display 202 may occupy a significant portion or all of a surface 204 (e.g., one of the largest surfaces 204) of housing 201 of device 200. Reference to a touch-sensitive screen display 202 includes cover layers that overlay the actual display and touch sensor elements of device 200, including a top cover layer (e.g., a glass cover layer). In the illustrated example, surface 204 is a surface of the top cover layer of touch-sensitive screen display 202. In an embodiment, the top cover layer (e.g., a glass cover layer) of touch screen display 202 is considered part of housing 201 of device 200.

In one embodiment, the large size of touch screen display 202 allows the touch-sensitive screen display 202 to present a wide variety of data, including a keyboard, a numeric keypad, program or application icons, and various other interfaces. In one embodiment, a user interacts with device 200 by touching touch-sensitive screen display 202 with a stylus, a finger, or any other object in order to interact with device 200 (e.g., select a program for execution or to type a letter on a keyboard displayed on the touch-sensitive screen display 202). In one embodiment, a user interacts with device 200 using multiple touches to perform various operations, such as to zoom in or zoom out when viewing a document or image. In some embodiments, such as home appliances, touch-sensitive screen display 202 does not change or changes only slightly during device operation, and recognizes only single touches.

Users may interact with device 200 by physically impacting surface 204 (or another surface) of housing 201 of device 200, shown as impact 206, using an object 208, such as, for example, one or more fingers, one or more styluses, or other objects. In one embodiment, surface 204 is a cover layer that overlies touch sensor array 106 and a display of device 200. As described above, users may perform a series of physical impacts (e.g., a double-tap, a triple-tap, or another implemented series of impacts) to initiate a transition of touch sensor 102 (e.g., touch sensor controller 108) from a first power mode (e.g., a low power mode) to a second power mode (e.g., to wake up touch sensor 102 (e.g., touch sensor controller 108) of device 200). Impact sensor 104 detects impacts 206 and communicates an output signal indicative of the detected impacts 206. Touch sensor controller 108 (e.g., a monitoring component of touch sensor controller 108) receives the output signal from impact sensor 104 and initiates, based on the output signal corresponding to a predefined impact pattern (e.g., a double-tap occurring within a predetermined period of time), the transition of touch sensor 102 (e.g., touch sensor controller 108) from the first power mode to the second power mode.

Impact sensor 104 may be located anywhere within device 200. In one embodiment, impact sensor 104 is positioned to optimize detection of impacts to surface 204 of housing 201 of device 200 that overlays touch sensor array 106 and the display of device 200. For example, impact sensor 104 may be positioned in an area underlying touch-sensitive screen display 202. Locating impact sensor 104 within device 200 in an area such that impact sensor 104 detects impacts 206 to surface 204 (e.g., a cover layer) of housing 201 of device 200 overlying touch sensor array 106 and the display of device 200 may increase the likelihood that impact sensor 104 detects deliberate attempts by a user of device 200 to impact the surface 204 (e.g., by tapping surface 204) and largely ignores or otherwise does not detect (or does not sufficiently detect) impacts to other areas of the device or otherwise unintended impacts. Additionally or alternatively, as described in greater detail below with reference to FIG. 4, this arrangement may increase the likelihood that conditions following a detected impact are suitable for calibrating touch sensor 102.

Device 200 includes buttons 210a-210c, which may perform any purpose in relation to the operation of device 200. One or more of buttons 210a-210c (e.g., button 210b) may operate as a so-called "home button" that, at least in part, indicates to device 200 that a user is preparing to provide input to touch sensor 102 of device 200. As described in greater detail below, an embodiment of the present disclosure may reduce or eliminate various reasons for including a "home button."

Figure 3:
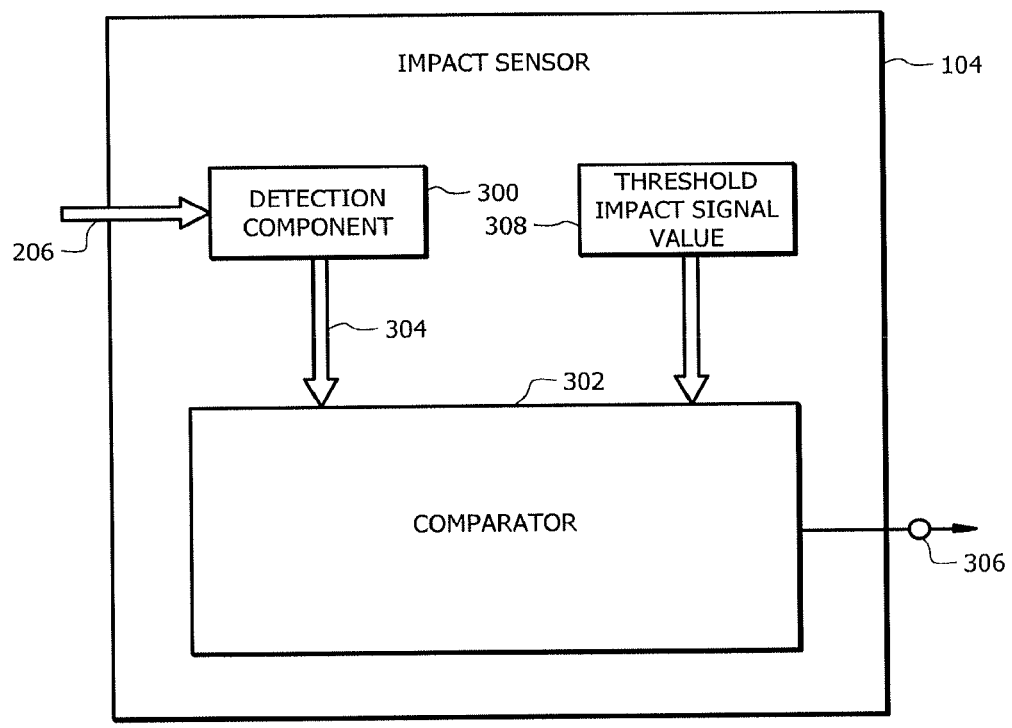
FIG. 3 illustrates a block diagram of an example impact sensor, according to an embodiment of the present disclosure.

FIG. 3 illustrates a block diagram of an example impact sensor 104, according to an embodiment of the present disclosure. In the illustrated example, impact sensor 104 includes a detection component 300 and a comparator 302. Although this disclosure describes a particular impact sensor 104 having a particular implementation with particular components, this disclosure contemplates other impact sensors having other implementations.

Detection component 300 detects physical impacts (shown as impacts 206) to a surface 204 of housing 201 of device 200. Detection component 300 may be implemented using any components that detect impacts 206, depending on the type of impact sensor 104 used. Detection component 300 generates impact signals 304, which may be, for example, electronic signals, wherein impact signals 304 are indicative of impacts 206 to surface 204 of housing 201 of device 200 detected by detection component 300. In one embodiment, impact signals 304 are electronic waveforms indicating a value (e.g., a voltage) or series of values (e.g., a series of voltages) measured by detection component 300. The generated impact signals 304 may include both portions that are intended impacts and portions that are unintended (e.g., accidental) impacts. These impact signals 304 are sent to a comparator 302 for evaluation. In the illustrated example, impacts 206 included in impact signals 304 are considered potential impacts until evaluated by comparator 302 to detect whether portions of the impact signal 304 correspond to a threshold impact signal value.

Comparator 302 evaluates impact signals 304 of detection component 300 to detect whether the potential impacts 206 reflected in impact signals 304 should be ignored or communicated as an output signal 306 to touch sensor controller 108 (e.g., a monitoring component of touch sensor controller 108) for further analysis. In one embodiment, comparator 302 applies a threshold (e.g., a threshold impact signal value 308) to detect whether a detected potential impact 206 is sufficient to register as an intended impact 206. For example, comparator 302 may process impact signal 304 indicative of impacts 206 to surface 204 of housing 201 of device 200, by comparing impact signal 304 to threshold impact signal value 308, to detect whether portions of impact signal 304 correspond to threshold impact signal value 308. In such an example, output signal 306 communicated by impact sensor 104 may include portions of impact signal 304 that correspond to threshold impact signal value 308 but exclude portions of impact signal 304 that do not correspond to threshold impact signal value 308. Those portions of impact signal 304 that correspond to threshold impact signal value 308 are considered to correspond to intended impacts 206.

Comparator 302 may be implemented using any components configured to detect whether impact signals 304 correspond to threshold impact signal value 308). As just one example, comparator 302 is implemented as an operation amplifier that receives as a first input the impact signal 304 and as a second input a reference value reflecting threshold impact signal value 308. The output of the operational amplifier indicates whether a portion of impact signal 304 corresponds to threshold impact signal value 308, and thus whether the impact 206 reflected by that portion of impact signal 304 corresponds to an intended impact 206. For purposes of this description "corresponding to" a threshold impact includes a value being greater than threshold impact signal value 308 or being greater than or equal to threshold impact signal value 308, depending on the implementation. Applying threshold impact signal value 308 to the impact signal generated by impact sensor 104 (whether by impact sensor 104 or another component) may reduce or eliminate unintended impacts to surface 204 of housing 201 of device 200 causing the wake-up operations described herein to be triggered in unintended situations.

In one embodiment, threshold impact signal value 308 is configurable by a user of device 200. For example, an operating system of device 200 may provide a user of device 200 with an ability to specify (e.g., select from predefined options for) threshold impact signal value 308. As a particular example, an operating system of device 200 may provide a user of device 200 with an ability to select a sensitivity of the device to "taps" to "wake from sleep." In this example, the selected sensitivity level maps to a corresponding threshold impact signal value 308 that is then set by impact sensor 104 for evaluating impacts.

If comparator 302 detects that a portion of impact signal 304 does not correspond to threshold impact signal value 308, then comparator 302 (or another component of impact sensor 104) causes that portion of impact signal 304 to be disregarded or otherwise ignored. For example, this outcome of the comparison of the impact signal 304 to threshold impact signal value 308 may indicate that the detected impact 206 (if any) was insufficient to register as an intended impact 206. If comparator 302 detects that a portion of impact signal 304 corresponds to threshold impact signal value 308, then comparator 302 (or another component of impact sensor 104) causes that portion of impact signal 304 to be output from impact sensor 104 as output signal 306. In one embodiment, output signal 306 is indicative of the impact 206 that resulted in impact signal 304. Over time, output signals 306 are indicative of multiple impacts 206 reflected by impact signal 304. Any processing may be performed on output signal 306 prior to impact sensor 104 outputting output signal 306. As just one example, impact sensor 104 may amplify output signal 306 prior to outputting output signal 306. Impact sensor 104 may communicate output signal 306 to touch sensor controller 108.

Although an example in which impact sensor 104 detects whether portions of impact signals 304 correspond to threshold impact signal value 308 has been described, the present disclosure contemplates touch sensor controller 108 (e.g., a monitoring component of touch sensor controller 108) detecting whether portions of impact signals 304 correspond to threshold impact signal value 308. For example, in this example scenario, impact sensor 104 communicates impact signal 304 as output signal 306 (e.g., without processing impact signal 304 by comparator 302). Touch sensor controller 108 (e.g., a monitoring component of touch sensor controller 108) receives the communicated impact signal 304 (as output signal 306) and detects whether portions of the output signal 306 correspond to threshold impact signal value 308.

FIG. 3 illustrates just one example of an impact sensor 104, and the present disclosure contemplates other implementations of impact sensor 104. As just one other example, impact sensor 104 may be implemented with comparator 302 omitted or configured to bypass comparator 302. In such an example, detection component 300 detects physical impacts (shown as impacts 206) to a surface 204 of housing 201 of device 200. Detection component 300 generates impact signals 304, which may be, for example, electronic signals, wherein impact signals 304 are indicative of impacts 206 to surface 204 of housing 201 of device 200 detected by detection component 300. In one embodiment, impact signals 304 are electronic waveforms indicating a value (e.g., a voltage) or series of values (e.g., a series of voltages) measured by detection component 300. In one particular example, impact signal 304 is a decaying sine wave. The generated impact signals 304 may include both portions that are intended impacts and portions that are unintended (e.g., accidental) impacts.

Continuing with this example, rather than sending these impact signals 304 to comparator 302 (which may be omitted or bypassed) for evaluation, detection component 300 outputs impact signals 304 as output signals 306. For example, detection component 300 (or another component of an impact sensor 104) may output as output signals 306 the electronic waveforms indicating a value (e.g., a voltage) or series of values (e.g., a series of voltages) measured by detection component 300. In one particular example, output signal 306 is a decaying sine wave. As with output signals 306 that have been processed by comparator 302, impact signals 304 transmitted as output signals 306 by detection component 300 may be output to the monitoring component of touch sensor 102. Additionally, even in an embodiment in which comparator 302 is omitted or bypassed, the present disclosure contemplates impact sensor 104 performing any processing of output signal 306 before outputting output signal 306. For example, impact signals 304 may be modulated prior to being output as output signals 306.

Figure 4:
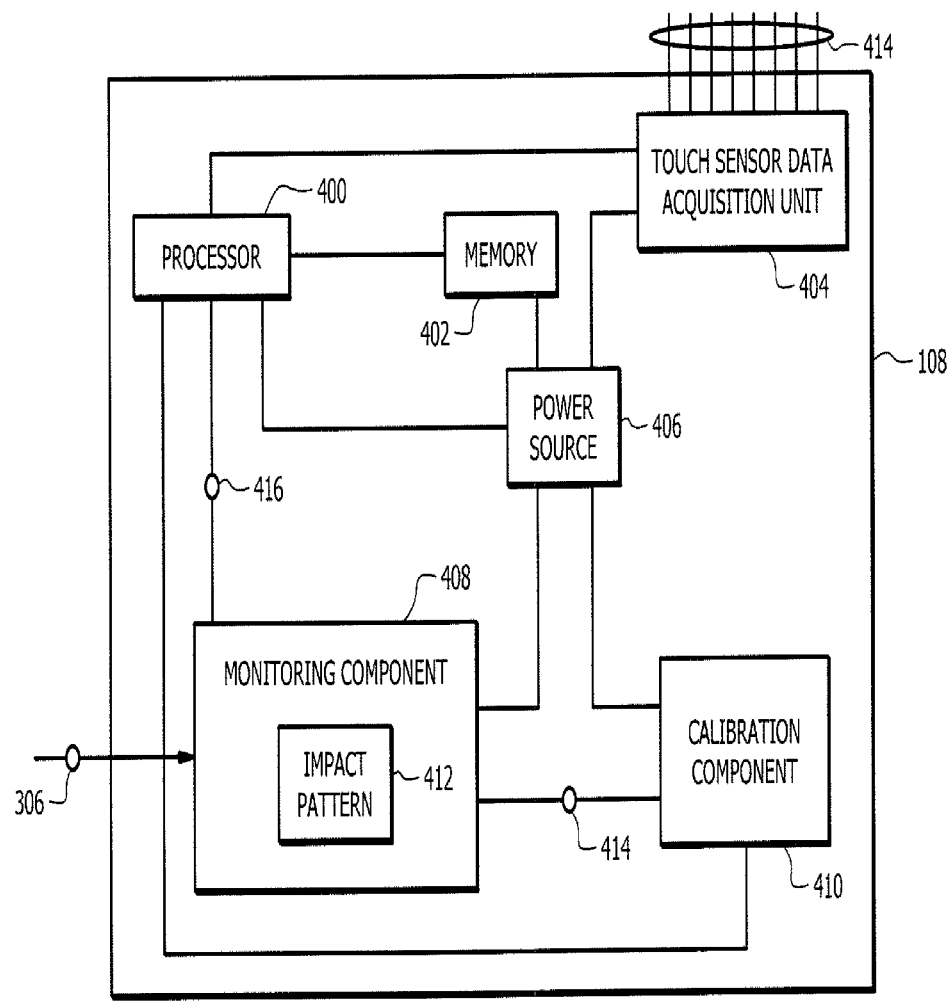
FIG. 4 illustrates a block diagram of an example touch sensor controller, according to an embodiment of the present disclosure.

FIG. 4 illustrates a block diagram of an example touch sensor controller 108 of touch sensor 102, according to an embodiment of the present disclosure. In the illustrated example, touch sensor controller 108 includes processor 400, memory 402, touch sensor data acquisition unit 404, power source 406, impact sensor monitoring component 408, and calibration component 410. Although this disclosure describes a particular touch sensor controller 108 having a particular implementation with particular components, this disclosure contemplates touch sensor controller 108 having any implementation with any components. Furthermore, although particular FIG. 4 illustrates particular components of touch sensor controller 108 being coupled together in a particular arrangement, the present disclosure contemplates the components of touch sensor controller 108 being coupled together in other manners, according to particular implementations.

Processor 400 includes any combination of hardware, firmware, and software that operates to control and process information. Processor 400 may be a programmable logic device, a microcontroller, a microprocessor, any processing device, or any combination of the preceding. Although a single processor 400 is illustrated, touch sensor controller 108 may include any number of processors 400. Among other potential operations, processor 400 controls touch sensing activities of touch sensor controller 108.

Memory 402 stores, either permanently or temporarily, data, operational software, or other information for access and/or execution by processor 400. Memory 402 includes any one or a combination of volatile or non-volatile local or remote devices for storing information. For example, memory 402 may include RAM, ROM, magnetic storage devices, optical storage devices, or any other information storage device or a combination of these devices. Although a single memory 402 is illustrated, touch sensor controller 108 may include any number of memories 402. Among other potential data, memory 402 stores programming for execution by the processor 400 to cause the processor to perform its associated operations.

Touch sensor data acquisition unit 404 includes a component or collection of components that interacts with touch sensor array 106 to facilitate detection of objects in proximity to touch sensor array 106. The components of touch sensor data acquisition unit 404 may depend on the type of touch sensor array 106 or arrays 106 implemented in the device housing touch sensor 102 (e.g., device 200).

In one embodiment, touch sensor data acquisition unit 404 includes a drive unit and a sense unit. In such an implementation, the drive unit supplies drive signals to the drive electrodes of touch sensor array 106, and the sense unit senses charge at the capacitive nodes of touch sensor array 106 and provides measurement signals to processor 400 representing capacitances at the capacitive nodes. Processor 400 controls the supply of drive signals to the drive electrodes by the drive unit and processes measurement signals from the sense unit to detect and process the presence and position of a touch or proximity input within touch-sensitive areas of touch sensor array 106. Processor 400 may also track changes in the position of a touch or proximity input within touch-sensitive areas of touch sensor array 106. In one embodiment, the programming for execution by processor 400 stored by memory 402 includes programming for controlling the drive unit to supply drive signals to the drive electrodes, programming for processing measurement signals from the sense unit, and other programming.

Touch sensor data acquisition unit 404 couples to touch sensor array 106, either directly or indirectly, via connections 114. In one embodiment, connection 114 includes conductive lines on the FPC coupling touch sensor controller 108 (via touch sensor data acquisition unit 404) to connection pads 112, in turn coupling touch sensor controller 108 (via touch sensor data acquisition unit 404) to tracks 110 and to the drive or sense electrodes of touch sensor array 106. In another embodiment, connection pads 112 are connected to an electro-mechanical connector (such as, for example, a zero insertion force wire-to-board connector). Connection 114 may or may not include an FPC. This disclosure contemplates any connection 114 between touch sensor controller 108 and touch sensor array 106.

Power source 406 may be any type of stored-energy source, including electrical or chemical-energy sources, for powering the operation of an active stylus. In an embodiment, power source 406 may be charged with energy from a user or device. Additionally or alternatively, in an embodiment, power source 406 may provide power to or receive power from the device or other external power source. Power source 406 may also be powered by a wired connection through an applicable port coupled to a power source. Power source 406 may include multiple types of power sources.

In one embodiment, different components of touch sensor controller 108 consume different amounts and/or types of power and a particular component of touch sensor controller 108 may consume different amounts of power depending on the mode of operation of the particular component. Power source 406 may be capable of directing (or being controlled to direct) particular amounts and types of power to the various components of touch sensor controller 108. As just one example, certain components of touch sensor controller 108 may be powered while other components are powered down, such as may be the case in a low power mode. Power source 406 is capable of directing (or being controlled to direct) power to components in such an embodiment. Additionally, although illustrated separately from other components of touch sensor controller 108, power source 406 could be located on another component of touch sensor controller 108 or divided into multiple parts each positioned on a corresponding component of touch sensor controller 108.

Monitoring component 408 monitors and evaluates output signal 306 from impact sensor 104 to detect whether to initiate a transition of touch sensor 102 (e.g., touch sensor controller 108) from a first power mode (e.g., a low power mode) to a second power mode (e.g., waking touch sensor 102 (e.g., touch sensor controller 108) from the low power mode). Monitoring component 408 is implemented using any combination of hardware, firmware, and software.

In one embodiment, monitoring component 408 is formed on touch sensor controller 108. For example, monitoring component 408 may be formed on the same silicon on which touch sensor controller 108 is formed. Although monitoring component 408 is illustrated as being part of touch sensor controller 108, monitoring component 408 may be separate from or part of touch sensor controller 108. For example, the present disclosure contemplates monitoring component 408 being physically distinct from but communicatively coupled to touch sensor controller 108.

In one embodiment, monitoring component 408 is a relatively low power component that monitors and evaluates output signal 306 from impact sensor 104. Although particular considerations for power consumption levels for monitoring component 408 are described, the present disclosure contemplates monitoring component 408 consuming any amount of power, according to particular implementation considerations.

As described above, in one embodiment, impact sensor 104 and monitoring component 408 consume less power than would be used to power touch sensor controller 108 to perform touch sensing operations, such as for example scanning touch sensor array 106 to detect the presence of an object (e.g., in proximity to touch sensor array 106). The low power consumed by impact sensor 104 and monitoring component 408 to perform their associated operations relative to the power consumed by touch sensor controller 108 to perform touch sensing operations, such as for example scanning touch sensor array 106 to detect the presence of an object (e.g., in proximity to touch sensor array 106), may contribute to various advantages of certain embodiments of the present disclosure. For example, the ability of impact sensor 104 and monitoring component 408 to perform their associated operations using less power than would be consumed by touch sensor 102 (e.g., touch sensor controller 108) to monitor touch sensor array 106 for the presence of objects may contribute to an ability of a device 200 including impact sensor 104 and monitoring component 408 to wake up from a low power mode using less power than would be used to wake touch sensor 102 from a low power mode by using touch sensor 102 to monitor touch sensor array 106 for the presence of objects (e.g., in proximity to touch sensor array 106).

In operation of an example embodiment, monitoring component 408 receives output signal 306 from impact sensor 104. As described above, in one embodiment, detection component 300 (or another component of an impact sensor 104) may output as output signals 306 the electronic waveforms indicating a value (e.g., a voltage) or series of values (e.g., a series of voltages) measured by detection component 300 (e.g., impact signals 304). In one particular example, output signal 306 is a decaying sine wave. Alternatively, as described above, in one embodiment, impact sensor 104 evaluates impact signals 304 using a comparator and associated threshold impact signal value 308 prior to outputting output signal 306.

In one embodiment, monitoring component 408 detects whether output signal 306 corresponds to a predefined impact pattern 412. In one embodiment, predefined impact pattern 412 specifies a predetermined number of impacts occurring within a predetermined period of time. As particular examples, predefined impact pattern 412 may correspond to a double-tap impact pattern, a triple-tap impact pattern, or any other suitable impact pattern occurring within a predetermined period of time. For example, a suitable impact pattern appropriate for predefined impact pattern 412 reflects an impact pattern reasonably distinguishable from an object inadvertently impacting surface 204 of housing 201 of device 200.

In one example, predefined impact pattern 412 reflects a signal profile of a signal that matches an impact pattern (e.g., a double-tap impact pattern, a triple-tap impact pattern, or any other suitable impact pattern occurring within the predetermined period of time). In this example, monitoring component 408 may compare output signal 306 to predefined impact pattern 412 to determine whether output signal 306 corresponds to predefined impact pattern 412, and to thereby determine whether the impact pattern (e.g., a double-tap impact pattern, a triple-tap impact pattern, or any other suitable impact pattern occurring within the predetermined period of time) reflected by predetermined impact pattern 412 has occurred.

As just one particular example, output signal 306 may be a decaying sine wave. Predefined impact pattern 412 may reflect decaying sine waves occurring within a predetermined amount of time. For example, if predefined impact pattern 412 reflects a double-tap impact pattern, predefined impact pattern 412 may reflect two decaying sine waves (e.g., one for each impact) occurring within a predetermined period of time. In such an example, monitoring component 408 analyzes one or more output signals 306 to determine whether the one or more output signals 306 include decaying sine waves that correspond to the decaying sine waves of predefined impact pattern 412 occurring within the predetermined period of time.

Although particular techniques for detecting by impact sensor 104 impacts and for determining whether an output signal 306 corresponds to a predefined impact pattern 412 are described, the present disclosure contemplates any technique for detecting by impact sensor 104 impacts and for determining whether an output signal 306 corresponds to a predefined impact pattern 412.

In one embodiment, predefined impact pattern 412 is configurable by a user of device 200. For example, an operating system of device 200 may provide a user of device 200 with an ability to specify (e.g., select from predefined options for) predefined impact pattern 412. As a particular example, an operating system of device 200 may provide a user of device 200 with an ability to select between a double-tap impact pattern and a triple-tap impact pattern. Additionally or alternatively, the predetermined period of time for predefined impact pattern 412 may be configurable by a user of device 200. For example, an operating system of device 200 may provide a user of device 200 with an ability to specify (e.g., select from predefined options for) the predetermined period of time for predefined impact pattern 412. As a particular example, an operating system of device 200 may provide a user of device 200 with an ability to select from a set of speeds (e.g., a sliding scale of speeds) to specify the predetermined period of time for predefined impact pattern 412.

Although an example in which monitoring component 408 detects whether output signal 306 corresponds to predefined impact pattern 412 has been described, the present disclosure contemplates impact sensor 104 detecting whether output signal 306 corresponds to predefined impact pattern 412. In such an example, monitoring component 408 may detect that output signal 306 corresponds to predefined impact pattern 412 based on monitoring component 408 receiving output signal 306 (e.g., because impact sensor 104 already detected that output signal 306 corresponds to predefined impact pattern 412).

If monitoring component 408 detects that output signal 306 corresponds to predefined impact pattern 412, then monitoring component 408 initiates, based on output signal 306 corresponding to predefined impact pattern 412, a transition of touch sensor 102 (e.g., touch sensor controller 108) from a first power mode (e.g., a low power mode) to a second power mode. As described above, in one embodiment, the first power mode includes scanning of touch sensor array 106, by touch sensor controller 108 for example, for the presence of an object (e.g., in proximity to touch sensor array 106) being powered down. For example, touch sensor 102 being in a low power mode may include touch sensor controller 108 being in a mode in which touch sensor controller 108 does not receive power for scanning touch sensor array 106 for an object in proximity to touch sensor array 106. During the low power mode, monitoring component 408 is powered such that monitoring component 408 monitors for output signals 306 communicated by impact sensor 104 is active and performs associated operations of monitoring component 408. In one embodiment, monitoring component 408 initiates a transition of touch sensor 102 from the first power mode (e.g., the low power mode) to the second power mode by communicating a wake-up signal 416 to processor 400 of touch sensor controller 108. Wake-up signal 416 may act as an interrupt that causes processor 400 to again receive power (or receive additional power, beyond that used to perform operations performed even when in the low power mode, for example) for scanning touch sensor array 106 for an object in proximity to touch sensor array 106.

Although the present disclosure describes an embodiment in which touch sensor controller 108 (e.g., monitoring component 408 of touch sensor controller 108) initiates a transition of touch sensor 102 (e.g., touch sensor controller 108) from a first power mode (e.g., a low power mode) to a second power mode, the present disclosure contemplates touch sensor controller 108 (e.g., monitoring component 408 of touch sensor controller 108) initiating the transition of touch sensor 102 (e.g., touch sensor controller 108) from the first power mode to the second power mode. As just one example, touch sensor controller 108 (e.g., monitoring component 408 of touch sensor controller 108) may initiate, based on output signal 306 corresponding to predefined impact pattern 412, a transition of a processor (e.g., separate from processor 400 of touch sensor controller 108) of device 200 from a first power mode, such as for example a standby mode, to a second power mode.

Calibration component 410 facilitates calibration of touch sensor 102 for detection of objects in proximity to touch sensor array 106. Various environmental factors can affect a touch sensor, even when the touch sensor is not in use. As just one example, the temperature of the environment around the touch sensor can affect the circuitry of touch sensor 102 (e.g., touch sensor controller 108), such as for example by changing properties of the touch sensor circuitry. As touch sensor 102 is activated after a period of rest, touch sensor 102 warms up. Failure to recalibrate touch sensor 102 to adjust for thermal drifts and other changes can affect whether touch sensor 102 properly detects the presence of objects (e.g., in proximity to touch sensor array 106).

An embodiment of the present disclosure may provide for improved calibration. When device 200 is in a pocket or bag, for example, other objects may rub against device 200, causing thermal conditions around touch sensor 102 to change. Calibrating touch sensor 102 under these conditions not only involves powering touch sensor 102 to perform the calibration even though touch sensor 102 is unused by a user of device 200, but also may lead to inaccurate calibration. In one embodiment of the present disclosure, calibrating touch sensor 102 in response to detecting impacts 206 that correspond to predefined impact pattern 412 (e.g., in response to a double- or triple-tap) improves calibration of touch sensor 102, as a user's hand can reasonably be assumed to be in proximity to touch sensor array 106 such that touch sensor 102 is calibrated under more appropriate conditions.

Although an example in which impact sensor 104 detects whether portions of impact signals 304 correspond to threshold impact signal value 308 has been described, the present disclosure contemplates touch sensor controller 108 (e.g., monitoring component 408 of touch sensor controller 108) detecting whether portions of impact signals 304 correspond to threshold impact signal value 308. For example, in this example scenario, impact sensor 104 communicates impact signal 304 as output signal 306 (e.g., without processing impact signal 304 by comparator 302). Touch sensor controller 108 (e.g., monitoring component 408) receives the communicated impact signal 304 (as output signal 306) and detects whether portions of the output signal 306 correspond to threshold impact signal value 308 and thus correspond to an intended impact 206.

As just one particular example of this embodiment, monitoring component 408 detects, based on output signal 306 indicative of impacts 206 to surface 204 of housing 201 of device 200, that output signal 306 corresponds to predefined impact pattern 412 by detecting that portions of output signal 306 correspond to threshold impact signal value 308, and therefore correspond to an intended impact 206, and detecting that the portions of output signal 306 corresponding to impacts 206 reflect the predetermined number of impacts of predefined impact pattern 412 and occur within the predetermined period of time of predefined impact pattern 412.

Figure 5:
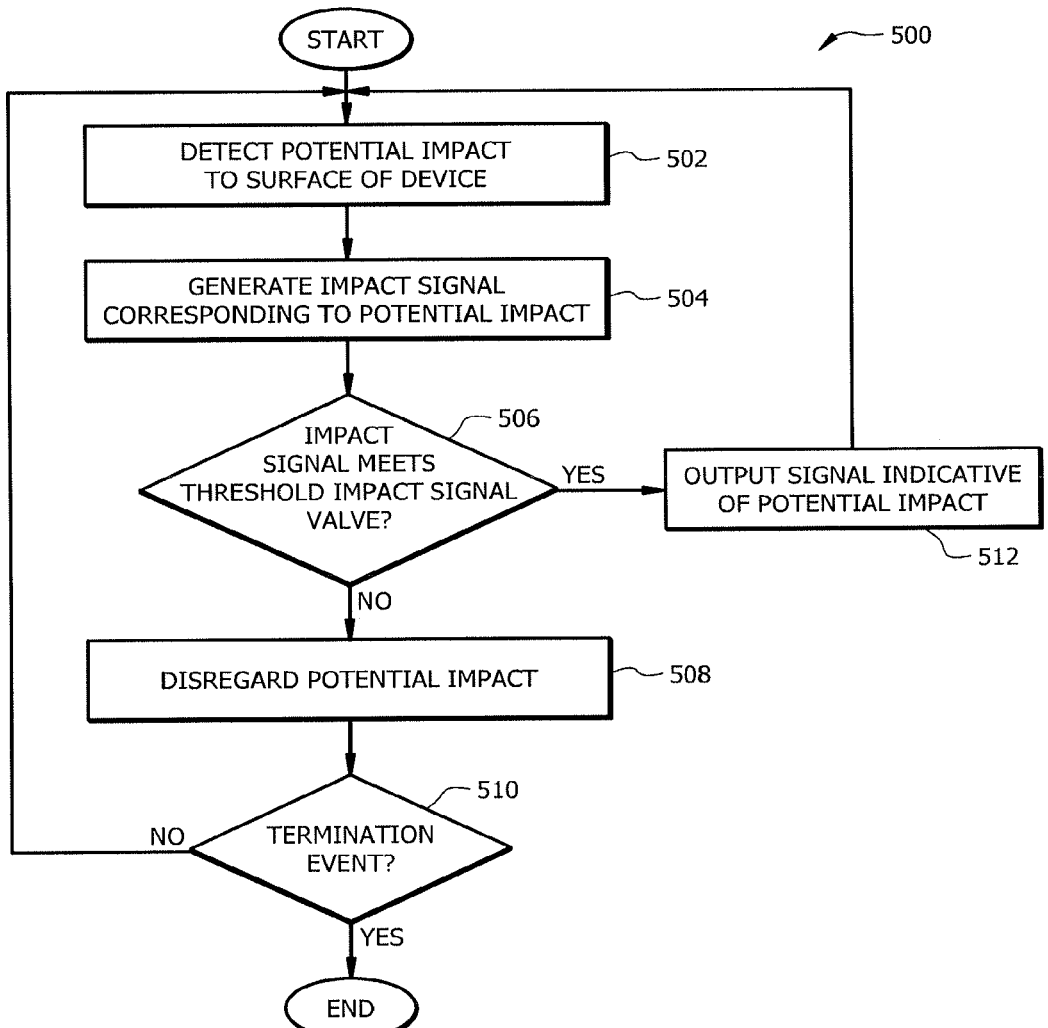
FIG. 5 illustrates an example method for detecting an impact using an impact sensor, according to an embodiment of the present disclosure.

FIG. 5 illustrates an example method 500 for detecting an impact 206 using impact sensor 104, according to an embodiment of the present disclosure. At step 502, impact sensor 104 detects a potential impact 206 to surface 204 of housing 201 of device 200. For example, detection component 300 of impact sensor 104 may detect the potential impact 206 to surface 204 of housing 201 of device 200. The manner in which detection component 300 detects potential impact 206 depends on the type of impact sensor 104 used in device 200.

At step 504, impact sensor 104 generates an impact signal 304 corresponding to the potential impact 206 to surface 204 of housing 201 of device 200. For example detection component 300 of impact sensor 104 may generate impact signal 304 for the potential impact 206 to surface 204 of housing 201 of device 200. In one embodiment, impact signals 304 are waveforms indicating a voltage or series of voltages measured by detection component 300. The generated impact signals 304 may include both portions that are intended impacts and portions that are unintended impacts.

At step 506, impact sensor 104 detects whether the impact signal 304 for the potential impact 206 to surface 204 of housing 201 of device 200 corresponds to threshold impact signal value 308. For example, comparator 302 of impact sensor 104 may detect whether portions of the impact signal 304 generated at step 504 corresponds to threshold impact signal value 308. As just one particular example, comparator 302 of impact sensor 104 may compare the impact signal 304 for the potential impact 206 to the threshold signal value to detect whether portions of the impact signal 304 correspond to threshold impact signal value 308. If impact sensor 104 detects at step 506 that the impact signal 304 for the potential impact 206 does not correspond to threshold impact signal value 308, then at step 508, impact sensor 104 disregards the potential impact 206 as not being an impact 206. In one embodiment, step 508 is not an explicit step, but instead impact sensor 104 performs step 508 by simply not proceeding to step 512 with the impact signal 304 for the potential impact 206.

At step 510, impact sensor 104 detects whether a termination event has occurred. The present disclosure contemplates any termination event. As just a few examples, a termination event may include a failure of the power supply that supplies power to impact sensor 104, a complete powering down of device 200, a user-specified preference, or any other reason. In one embodiment, detecting whether a termination event has occurred is not an explicit detection by impact sensor 104, but instead simply results from the mechanism that caused the termination event (e.g., a complete powering down of device 200). In reality, method 500 could be terminated at any point due to a termination event; however, for ease of description and to simplify the flow chart of FIG. 5, the termination decision is shown at a single point of method 500. If impact sensor 104 detects at step 510 that a termination event has occurred, then method 500 ends. If impact sensor 104 does not detect a termination event at step 510, then method 500 returns to step 502 for impact sensor 104 to detect a next potential impact 206.

If impact sensor 104 detects at step 506 that portions of the impact signal 304 correspond to threshold impact signal value 308, then at step 512, impact sensor 104 communicates output signal 306 indicative of the detected impact 206. For example, output signal 306 communicated by impact sensor 104 may include the portions of impact signal 304 that correspond to threshold impact signal value 308. Method 500 also returns to step 502 for impact sensor 104 to detect a next potential impact 206.

FIG. 5 illustrates just one example method 500 for detecting an impact 206 using impact sensor 104, and the present disclosure contemplates other implementations the method. For example, as described above, impact sensor 104 may be implemented with comparator 302 omitted or in a manner configured to bypass comparator 302. In such an example, detection component 300 detects physical impacts (shown as impacts 206) to a surface 204 of housing 201 of device 200. Detection component 300 generates impact signals 304, which may be, for example, electronic signals, wherein impact signals 304 are indicative of impacts 206 to surface 204 of housing 201 of device 200 detected by detection component 300. In one embodiment, impact signals 304 are electronic waveforms indicating a value (e.g., a voltage) or series of values (e.g., a series of voltages) measured by detection component 300. In one particular example, impact signal 304 is a decaying sine wave.

Continuing with this example, rather than sending these impact signals 304 to comparator 302 (which may be omitted or bypassed) for evaluation, detection component 300 outputs impact signals 304 as output signals 306. For example, detection component 300 (or another component of an impact sensor 104) may output as output signals 306 the electronic waveforms indicating a value (e.g., a voltage) or series of values (e.g., a series of voltages) measured by detection component 300. In one particular example, output signal 306 is a decaying sine wave. As with output signals 306 that have been processed by comparator 302, impact signals 304 transmitted as output signals 306 by detection component 300 may be output to the monitoring component of touch sensor 102. Additionally, even in an embodiment in which comparator 302 is omitted or bypassed, the present disclosure contemplates impact sensor 104 performing any processing of output signal 306 before outputting output signal 306. For example, impact signals 304 may be modulated prior to being output as output signals 306.

Figure 6:
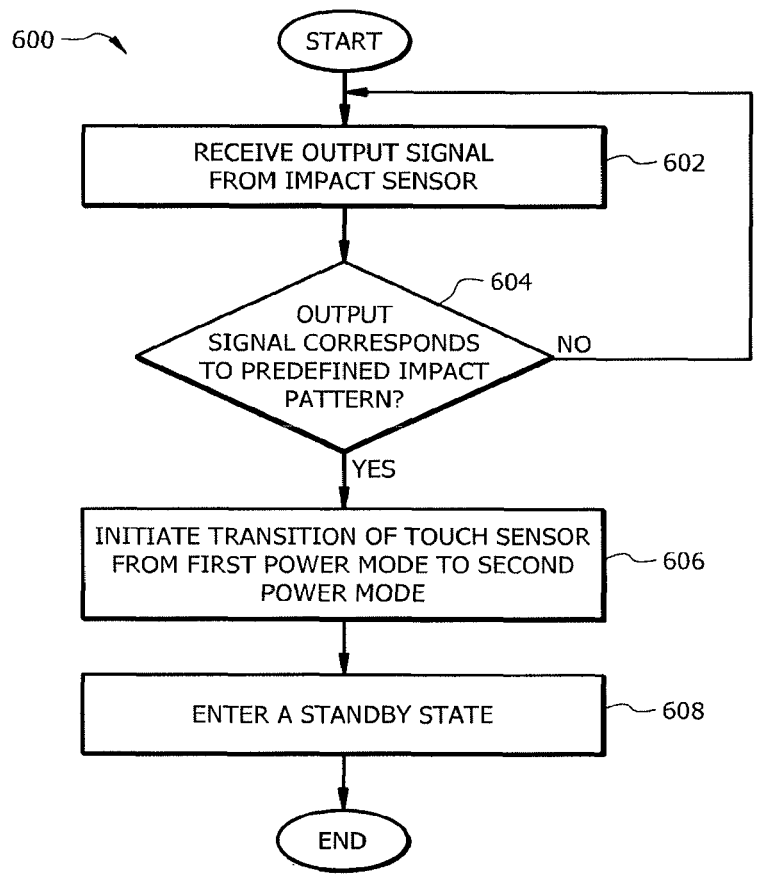
FIG. 6 illustrates an example method for transitioning a touch sensor from a first power mode to a second power mode using an impact sensor, according to an embodiment of the present disclosure.

FIG. 6 illustrates an example method 600 for transitioning touch sensor 102 from a first power mode to a second power mode using impact sensor 104, according to an embodiment of the present disclosure. For purposes of this example, it will be assumed that touch sensor 102 (e.g., touch sensor controller 108) begins in a first power mode (e.g., a low power mode). For example, in the first power mode, scanning of touch sensor array 106 by touch sensor controller 108 for detecting the presence of an object (e.g., in proximity) is powered down and monitoring, by monitoring component 408, for output signals 306 from impact sensor 104 is powered.

At step 602, monitoring component 408 of touch sensor controller 108 receives output signal 306 from impact sensor 104. For example, monitoring component 408 of touch sensor controller 108 may receive the output signal 306 communicated by impact sensor 104 at step 512 of method 500 of FIG. 5.

At step 604, monitoring component 408 of touch sensor controller 108 detects, based on output signal 306 indicative of impact 206, whether output signal 306 corresponds to a predefined impact pattern 412. In one embodiment, predefined impact pattern 412 specifies a predetermined number of impacts 206 occurring within a predetermined period of time. As particular examples, predefined impact pattern 412 may correspond to a double-tap impact pattern, a triple-tap impact pattern, or any other suitable impact pattern. For example, a suitable impact pattern appropriate for predefined impact pattern 412 reflects an impact pattern reasonably distinguishable from an object inadvertently impacting surface 204 of housing 201 of device 200.

Although for purposes of method 600, output signal 306 is described as being indicative of an impact 206, over time, output signals 306 may collectively form an output signal 306 that is indicative of a plurality of impacts 206. In the described example, and assuming that the predefined impact pattern 412 specifies at least two impacts, monitoring component 408 receives at least two output signals 306 corresponding to two impacts 206 before detecting that the output signal 306 corresponds to a predefined impact pattern. In one embodiment, to detect, based on output signal 306 indicative of impact 206, whether output signal 306 corresponds to a predefined impact pattern 412, monitoring component 408 detects whether multiple impacts 206 indicated by an output signal 306 that is indicative of a multiple impacts 206 to surface 204 of housing 201 of device 200 occur within a predetermined period of time. As just one particular example, monitoring component 408 may detect whether an output signal 306 reflects a double-tap impact pattern by detecting that output signal 306 is indicative of two impacts 206 that occur within a predetermined period of time.

If monitoring component 408 does not detect at step 604 that output signal 306 corresponds to predefined impact pattern 412, then monitoring component 408 returns to step 602 to wait for a further output signal 306 from impact sensor 104.

If monitoring component 408 detects at step 604 that output signal 306 corresponds to predefined impact pattern 412, then at step 606 monitoring component 408 initiates, based on output signal 306 corresponding to predefined impact pattern 412, a transition of touch sensor 102 (e.g., touch sensor controller 108) from a first power mode to a second power mode. For example, initiating the transition of touch sensor 102 (e.g., touch sensor controller 108) from the first power mode to the second power mode may be considered waking touch sensor 102 (e.g., touch sensor controller 108) from a low power mode. As described above, in one embodiment, the low power mode includes scanning of touch sensor array 106, by touch sensor controller 108 for example, for the presence of an object (e.g., in proximity to touch sensor array 106) being powered down. For example, touch sensor 102 being in a low power mode may include touch sensor controller 108 being in a mode in which touch sensor controller 108 is powered down from scanning touch sensor array 106 for the presence of an object (e.g., in proximity to touch sensor array 106). In one embodiment, monitoring component 408 initiates the transition of the first power mode to the second power mode (e.g., waking touch sensor 102 from the low power mode) by communicating a wake-up signal 416 to processor 400 of touch sensor controller 108. Wake-up signal 414 may act as an interrupt that causes processor 400 to again receive power (or receive additional power, beyond that used to perform operations performed even when in the low power mode, for example) for scanning touch sensor array 106 for the presence of an object (e.g., in proximity to touch sensor array 106).

In one embodiment, touch sensor 102 is calibrated for scanning touch sensor array 106 for the presence of an object (e.g., in proximity to touch sensor array 106). For example, initiating, based on output signal 306 corresponding to predefined impact pattern 412, a transition of touch sensor 102 (e.g., touch sensor controller 108) from the first power mode to the second power mode may include initiating calibration of the touch sensor. In one embodiment, monitoring component 408 communicates a wake-up signal 414 to calibration component 410 to cause calibration component to calibrate touch sensor 102. Calibration component 410 may work independently or with processor 400 to perform the calibration of touch sensor 102. Additionally or alternatively, processor 400 of touch sensor controller 108 may, in response to wake-up signal 414 from monitoring component 408, perform calibration of touch sensor 102, with or without assistance from a separate calibration component 410.

Although particular techniques for monitoring component 408 to initiate, based on output signal 306 corresponding to predefined impact pattern 412, waking touch sensor 102 from the lower power mode are described with reference to wake-up signals 414, 416, the present disclosure contemplates monitoring component 408 initiating, based on output signal 306 corresponding to predefined impact pattern 412, waking touch sensor 102 from the lower power mode in any manner.

At step 608, monitoring component 408 enters a standby state after which method 600 ends. For example, because touch sensor 102 has been woken from the low power mode, the operations of monitoring component 408 (e.g., including monitoring for an output signal from impact sensor 104) may be paused. When touch sensor 102 again enters the low power mode, monitoring component 408 resumes operations, including monitoring for an output signal from impact sensor 104.

The example methods described with respect to FIGS. 5 and 6 illustrate a scenario in which impact sensor 104 detects whether impact signals 304 for potential impacts 206 correspond to threshold impact signal value 308 (e.g., at step 508). Although this scenario is illustrated and primarily described, the present disclosure contemplates touch sensor controller 108 (e.g., monitoring component 408) detecting whether impact signals for potential impacts 206 correspond to threshold impact signal value 308. For example, in this example scenario, impact sensor 104 communicates impact signal 304 as output signal 306 (e.g., without processing impact signal 304 by comparator 302). Touch sensor controller 108 (e.g., monitoring component 408) receives the communicated impact signal 304 (as output signal 306) and as part of detecting, based on output signal 306, that output signal 306 corresponds to the predefined impact pattern 412, monitoring component 408 detects whether portions of the output signal 306 corresponding to an impact correspond to threshold impact signal value 308.

As just one particular example of this embodiment, monitoring component 408 detects, based on output signal 306 indicative of impacts 206 to surface 204 of housing 201 of device 200, that output signal 306 corresponds to predefined impact pattern 412 by detecting that portions of output signal 306 corresponding to impacts 206 correspond to threshold impact signal value 308 and detecting that the portions of output signal 306 corresponding to impacts 206 reflect a predetermined number of impacts of predefined impact pattern 412 and occur within the predetermined period of time of predefined impact pattern 412.

Furthermore, the example methods described with respect to FIGS. 5 and 6 illustrate a scenario in which monitoring component 408 detects whether output signal 306 corresponds predefined impact pattern 412 (e.g., at step 604). Although this scenario is illustrated and primarily described, the present disclosure contemplates impact sensor 104 detecting whether output signal 306 corresponds to a predefined impact pattern. For example, in this example scenario, impact sensor 104 detects whether output signal 306 corresponds a predefined impact pattern and communicates an output signal 306 to monitoring component 408 based on output signal 306 corresponding to the predefined impact pattern, and, in response to receiving output signal 306, monitoring component 408 initiates waking touch sensor 102 from the low power mode.

Although this disclosure describes and illustrates particular steps of the methods of FIGS. 5 and 6 as occurring in a particular order, this disclosure contemplates any steps of the methods of FIGS. 5 and 6 occurring in any order. An embodiment may repeat one or more steps of the methods of FIGS. 5 and 6. Moreover, although this disclosure describes and illustrates an example method for detecting an impact 206 and waking touch sensor 102 using impact sensor 104 including the particular steps of the methods of FIGS. 5 and 6, this disclosure contemplates any method for detecting an impact and waking a touch sensor using an impact sensor including any steps, which may include all, some, or none of the steps of the methods of FIGS. 5 and 6. Moreover, although this disclosure describes and illustrates particular components performing particular steps of the methods of FIGS. 5 and 6, this disclosure contemplates any combination of any components performing any steps of the methods of FIGS. 5 and 6.

Embodiments of the present disclosure may provide one or more technical advantages. An embodiment of the present disclosure conserves power that would otherwise be consumed by device 200. For example, rather than rely on detecting an initial touch from a user through touch sensor 102 of device 200 (indicating that the user is preparing to use touch sensitive display 202), an embodiment of the present disclosure allows the user to provide an input via impact sensor 104. Detecting when to activate touch sensor 102 of device 200 based on input from impact sensor 104 may reduce or eliminate reasons to power touch sensor 102 (e.g., touch sensor controller 108) to detect an initial touch from a user. Impact sensor 104 is a low power component and may be monitored by a low power circuit (e.g., monitoring component 408) for detection of output signals 306 indicative of impacts 206 to surface 204 that correspond to predefined impact pattern 412. In one embodiment, impact sensor 104 and monitoring component 408 collectively consume less power than would otherwise be used to power touch sensor 102 (e.g., touch sensor controller 108) to detect input from a user.

As another example, an embodiment may reduce power consumed by device 200 by reducing or eliminating powering of touch sensor 102 (e.g., touch sensor controller 108) during periods of non-use to calibrate touch sensor 102 of device 200. Even during non-use of touch sensor 102 of device 200, various environmental conditions may alter properties of touch sensor controller 108. For example, the temperature of the environment around touch sensor 102, even when touch sensor 102 is not in use (e.g., when device 200 is in a pocket or bag), may cause measurements made by touch sensor controller 108 to drift, which can lead to inaccurate detection of objects in proximity to touch sensor array 106. Often, devices (e.g., device 200) consume power, even when not in use, to track drifts in measurements made by touch sensor controller 108 and other changes cause by the environment of the device.

Problems associated with clock drifts and other changes to the properties of touch sensor controller 108 during periods of non-use may be addressed by calibrating touch sensor 102. During this calibration process, touch sensor 102 (e.g., the capacitive system of touch sensor 102, including processor 400 of touch sensor controller 108) is powered. This calibration process may be performed at regular intervals, even when device 200 is not in use. An embodiment of the present disclosure reduces or eliminates powering of touch sensor 102 even during periods of non-use by calibrating touch sensor 102 in response to a wake up initiated in response to detecting impacts 206 that correspond to predefined impact pattern 412 (e.g., in response to a double- or triple-tap).

Furthermore, an embodiment of the present disclosure may provide for improved calibration. When device 200 is in a pocket or bag, for example, other objects may rub against device 200, causing thermal conditions around touch sensor 102 to change. Calibrating touch sensor 102 under these conditions may lead to inaccurate calibration. In one embodiment of the present disclosure, calibrating touch sensor 102 in response to detecting impacts 206 that correspond to predefined impact pattern 412 (e.g., in response to a double- or triple-tap) improves calibration of touch sensor 102, as a user's hand can reasonably be assumed to be in proximity to touch sensor array 106 such that touch sensor 102 is calibrated under more appropriate conditions.

An embodiment may reduce or eliminate the role of a button (e.g., a so-called "home button") for powering on touch sensor 102 of device 200. Devices, such as mobile phones or tablets for example, often include a so-called home button, which typically (though not necessarily) is a mechanical button. Buttons 210a-210c (e.g., button 210b) provide an example of such a home button. Often, a purpose of including this home button is to provide a mechanism for the user to indicate to device 200 that the user is preparing to use the touch-sensitive screen display 202. Various events may occur in response to a user pressing the home button, including calibration of touch sensor 102 and activation of touch sensor 102. Buttons consume space both on a surface of housing 201 of device 200 (often on the same surface 204 as the touch-sensitive screen display 202), as well as internal to device 200. Eliminating this home button, which may be possible with an embodiment of the present disclosure, may allow more of surface 204 of housing 201 of device 200 that would otherwise include the home button to be used for touch sensing and display. For example, by allowing a user to wake-up touch sensor 102 (e.g., touch sensor controller 108) of device 200 by impacting (e.g., tapping) a surface of housing 201 of device 200 (e.g., surface 204), the user may wake up touch sensor 102 (and possibly other components of device 200) without pressing a button to do so. An embodiment may even allow such a button to be omitted from device 200.

An embodiment may reduce or eliminate instances of so-called false dialing. Because an embodiment provides a technique for indicating to device 200 that a user is preparing to use the touch-sensitive screen display 202 of device 200 without powering touch sensor 102 of device 200, incidents of touch sensor 102 receiving inadvertent input (such as false dials) may be reduced or eliminated.

Certain embodiments of the invention may include none, some, or all of the above technical advantages. One or more other technical advantages may be readily apparent to one skilled in the art from the figures, descriptions, and claims included herein.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other computer-readable non-transitory storage media, or any combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Additionally, components referred to as being "coupled" includes the components being directly coupled or indirectly coupled.

This disclosure encompasses a myriad of changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus, comprising:
   a touch sensor;
   an impact sensor configured to perform operations comprising generating an output signal indicative of one or more impacts; and
   one or more controllers, the one or more controllers configured to initiate, responsive to the output signal corresponding to a predefined impact pattern that specifies an association between impacts and time, a transition of the touch sensor from a first power mode to a second power mode;
wherein:
in the first power mode, the one or more controllers are configured to receive power for scanning of a touch sensor array of the touch sensor; and
the transition from the first power mode to the second power mode causes the one or more controllers to initiate a scan of the touch sensor array.

2. The apparatus of claim 1, wherein the one or more controllers are configured to initiate the transition of the touch sensor from the first power mode to the second power mode by communicating a wake-up signal to a processor of the one or more controllers, wherein the wake-up signal causes the processor to receive the power for the scanning of the touch sensor array.

3. The apparatus of claim 1, wherein:
in the first power mode, the one or more controllers receive power for monitoring for output signals; and
in the first power mode, the power received for the scanning of the touch sensor array of the touch sensor is in addition to the power received for the monitoring for the output signals.

4. The apparatus of claim 1, wherein the one or more controllers are configured to:
monitor for output signals in the first power mode; and
pause the monitoring for the output signals in the second power mode.

5. The apparatus of claim 1, wherein the one or more controllers are further configured to determine that the output signal corresponds to the predefined impact pattern by:
detecting that portions of the output signal correspond to a threshold impact signal value; and
detecting that the portions of the output signal corresponding to the one or more impacts reflect a predetermined number of impacts of the predefined impact pattern and occur within a predetermined period of time of the predefined impact pattern.

6. The apparatus of claim 1, wherein the one or more controllers comprise one or more of a touch sensor controller and a monitoring controller.

7. The apparatus of claim 1, wherein the impact sensor comprises one or more of:
a vibration sensor;
a piezoelectric sensor; and
an accelerometer.

8. A non-transitory computer-readable medium embodying logic, the logic configured to, when executed by one or more processors, cause the one or more processors to perform operations comprising:
receiving, from an impact sensor, an output signal, the output signal indicative of one or more impacts to a device; and
initiating, responsive to the output signal corresponding to a predefined impact pattern that specifies an association between impacts and time, a transition of a touch sensor of the device from a first power mode to a second power mode;
wherein:
in the first power mode, the operations further comprise receiving power for scanning of a touch sensor array of the touch sensor; and
the transition from the first power mode to the second power mode causes the one or more processors to perform operations comprising initiating a scan of the touch sensor array.

9. The non-transitory computer-readable medium of claim 8, wherein initiating the transition of the touch sensor of the device from the first power mode to the second power mode comprises communicating a wake-up signal to a processor of the device, wherein the wake-up signal causes the processor to receive the power for the scanning of the touch sensor array.

10. The non-transitory computer-readable medium of claim 8, wherein:
in the first power mode, the operations further comprise receiving power for monitoring for output signals; and
in the first power mode, the power received for the scanning of the touch sensor array of the touch sensor is in addition to the power received for the monitoring for the output signals.

11. The non-transitory computer-readable medium of claim 8, wherein the operations further comprise:
monitoring for output signals in the first power mode; and
pausing the monitoring for the output signals in the second power mode.

12. The non-transitory computer-readable medium of claim 8, wherein the operations further comprise determining that the output signal corresponds to the predefined impact pattern by:
detecting that portions of the output signal correspond to a threshold impact signal value; and
detecting that the portions of the output signal corresponding to the one or more impacts reflect a predetermined number of impacts of the predefined impact pattern and occur within a predetermined period of time of the predefined impact pattern.

13. The non-transitory computer-readable medium of claim 8, wherein the impact sensor comprises one or more of:
a vibration sensor;
a piezoelectric sensor; and
an accelerometer.

14. A method, comprising
receiving, from an impact sensor, an output signal, the output signal indicative of one or more impacts to a device; and
initiating, by one or more controllers and responsive to the output signal corresponding to a predefined impact pattern that specifies an association between impacts and time, a transition of a touch sensor of the device from a first power mode to a second power mode;
wherein:
in the first power mode, the one or more controllers receive power for scanning of a touch sensor array of the touch sensor; and
the transition from the first power mode to the second power mode causes the one or more controllers to initiate a scan of the touch sensor array.

15. The method of claim 14, wherein initiating the transition of the touch sensor of the device from the first power mode to the second power mode comprises communicating a wake-up signal to a processor of the device, wherein the wake-up signal causes the processor to receive the power for the scanning of the touch sensor array.

16. The method of claim 14, wherein:
in the first power mode, the method further comprises receiving power for monitoring for output signals; and in the first power mode, the power received for the scanning of the touch sensor array of the touch sensor is in addition to the power received for the monitoring for the output signals.

17. The method of claim 14, further comprising:
monitoring for output signals in the first power mode; and
pausing the monitoring for the output signals in the second power mode.

18. The method of claim 14, further comprising determining that the output signal corresponds to the predefined impact pattern by:
detecting that portions of the output signal correspond to a threshold impact signal value; and
detecting that the portions of the output signal corresponding to the one or more impacts reflect a predetermined number of impacts of the predefined impact pattern and occur within a predetermined period of time of the predefined impact pattern.

19. The method of claim 14, wherein the one or more controllers comprise one or more of a touch sensor controller and a monitoring controller.

20. The method of claim 14, wherein the impact sensor comprises one or more of:
a vibration sensor;
a piezoelectric sensor; and
an accelerometer.

\* \* \* \* \*

UNITED STATES PATENT AND TRADEMARK OFFICE
CERTIFICATE OF CORRECTION

PATENT NO. : 10,969,857 B2
APPLICATION NO. : 16/232224
DATED : April 6, 2021
INVENTOR(S) : Martin J. Simmons Page 1 of 1

It is certified that error appears in the above-identified patent and that said Letters Patent is hereby corrected as shown below:

In the Specification
    Column 24,    Line 51,    change "touch sensitive display" to --touch-sensitive screen display--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*